(12) United States Patent
Iuliis et al.

(10) Patent No.: US 7,650,007 B2
(45) Date of Patent: Jan. 19, 2010

(54) LANYARD FOR HANDHELD ELECTRONIC DEVICE

(75) Inventors: Daniele De Iuliis, San Francisco, CA (US); Matthew Dean Rohrbach, San Francisco, CA (US); John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 855 days.

(21) Appl. No.: 11/212,514

(22) Filed: Aug. 24, 2005

(65) Prior Publication Data

US 2007/0053523 A1     Mar. 8, 2007

(51) Int. Cl.
*H04R 1/00* (2006.01)
*H04R 25/00* (2006.01)
(52) U.S. Cl. .................. 381/385; 381/374
(58) Field of Classification Search ........... 381/385; 181/128, 129; 455/90.3, 575.1, 575.2, 572
See application file for complete search history.

(56) References Cited

U.S. PATENT DOCUMENTS

| | | | |
|---|---|---|---|
| 3,117,484 | A | 1/1964 | Myers |
| 3,233,496 | A | 2/1966 | De Pew et al. |
| 4,404,714 | A | 9/1983 | Duran |
| 4,649,570 | A | 3/1987 | Terbrack et al. |
| 5,194,987 | A | 3/1993 | Moore et al. |
| D338,037 | S | 8/1993 | Miller et al. |
| D342,449 | S | 12/1993 | Mattheis |
| 5,640,459 | A | 6/1997 | Hedeen |
| D437,485 | S | 2/2001 | Hicks et al. |
| D462,523 | S | 9/2002 | Kalbach |
| D462,689 | S | 9/2002 | Moran |
| D467,416 | S | 12/2002 | Kalbach |
| 6,550,108 | B2 | 4/2003 | Pratl |
| 6,675,446 | B2 | 1/2004 | Buettell |
| 6,711,785 | B1 | 3/2004 | Hicks et al. |

(Continued)

FOREIGN PATENT DOCUMENTS

DE     20020096     2/2001

(Continued)

OTHER PUBLICATIONS

International Search Report and Written Opinion of PCT Application No. PCT/US2006/033186, mailed Apr. 24, 2007, 11 pages.

(Continued)

*Primary Examiner*—Brian Ensey
(74) *Attorney, Agent, or Firm*—Beyer Law Group LLP

(57) ABSTRACT

A lanyard for carrying or wearing portable electronic devices is disclosed. The lanyard includes a neck cord having data carrying capabilities. The lanyard also includes a harness that physically holds and operatively couples the portable electronic device to the neck cord. When a portable electronic device is coupled to the harness, the portable electronic device can be worn around a neck and communicate with an input and/or output (I/O) device (e.g., earphones) operatively coupled to the data carrying cord. That is, the I/O device can send data through the neck cord to the portable electronic device and/or receive data being carried by the neck cord from the portable electronic device. The lanyard facilitates greater ease in wearing portable electronic devices and enables better approaches for managing wires between portable electronic devices and peripheral I/O devices.

47 Claims, 7 Drawing Sheets

U.S. PATENT DOCUMENTS

| | | | |
|---|---|---|---|
| 6,776,317 | B1 | 8/2004 | Parker |
| D500,302 | S | 12/2004 | Deguchi |
| D500,485 | S | 1/2005 | Deguchi |
| 6,871,732 | B2 | 3/2005 | Flint et al. |
| D527,723 | S | 9/2006 | Andre et al. |
| D529,044 | S | 9/2006 | Andre et al. |
| D530,340 | S | 10/2006 | Andre et al. |
| D534,065 | S | 12/2006 | Andre et al. |
| D534,921 | S | 1/2007 | Andre et al. |
| D562,807 | S | 2/2008 | Andre et al. |
| 7,340,221 | B2 * | 3/2008 | Wikel et al. ............... 455/90.3 |
| D566,691 | S | 4/2008 | Andre et al. |
| 2002/0090099 | A1 * | 7/2002 | Hwang ....................... 381/312 |
| 2009/0143116 | A1 | 6/2009 | Harmon et al. |

FOREIGN PATENT DOCUMENTS

| | | |
|---|---|---|
| EP | 1361502 | 11/2003 |
| EP | 1379058 | * 1/2004 |
| EP | 1361502 | 1/2009 |
| JP | D1085073 | 9/2000 |
| JP | D1085080 | 9/2000 |
| JP | D1089527 | 10/2000 |
| JP | D1089528 | 10/2000 |
| JP | D1089529 | 10/2000 |
| JP | D1105429 | 4/2001 |
| JP | D1106452 | 4/2001 |
| JP | D1121650 | 9/2001 |
| JP | D1123108 | 10/2001 |
| JP | D1129386 | 12/2001 |
| JP | D1129387 | 12/2001 |
| JP | D1106151 | 8/2002 |
| JP | D1089530 | 10/2002 |
| JP | D1131037 | 10/2002 |
| JP | D1154927 | 10/2002 |
| JP | D1174623 | 6/2003 |
| JP | D1174710 | 6/2003 |
| JP | D1185408 | 9/2003 |
| JP | D1188267 | 10/2003 |
| JP | D1191223 | 12/2003 |
| JP | D1193941 | 1/2004 |
| JP | D1211811 | 7/2004 |
| JP | D1211812 | 7/2004 |
| WO | 03103255 | 12/2003 |

OTHER PUBLICATIONS

U.S. Appl. No. 29/212,168 entitled "Device Harness" filed Aug. 26, 2004.
U.S. Appl. No. 29/237,086 entitled "Lanyard" filed Aug. 24, 2005.
U.S. Appl. No. 29/237,287 entitled "Electronic Device Holder" filed Aug. 24, 2005.
U.S. Appl. No. 29/237,091 entitled "Clasp", filed Aug. 24, 2005.
U.S. Appl. No. 29/237,691 entitled "Lanyard" filed Sep. 2, 2005.
U.S. Appl. No. 29/220,038 entitled "Media Device" filed Dec. 23, 2004.
U.S. Appl. No. 29/220,035 entitled "Electronic Device" filed Dec. 23, 2004.
U.S. Appl. No. 29/220,120 entitled "Electronic Device" filed Dec. 23, 2004.
"ICE Bud: Lanyard Headphones for iPod® nano and shuffle", www.macally.com/spec.ipod/icebud.html, downloaded Nov. 10, 2005.
"ASCII" weekly publication issued on Jul. 29, 2003, No. 450, Design of USB Memory Audio Player (JPO publicly known Design No. HA15013509) received by the National Center for Industrial Property Information on Jul. 15, 2003.
"Crucial Gizmo! Hi-Speed 512MB USB Flash Drive", Xtreme Resources:: Your Xtreme Hardware Review and News Zone!, www.xtremeresources.com, downloaded Nov. 23, 2005.
"USB Flash Drive—Style DE (Best Seller)", www.memorysuppliers.com/usbfldrstde.html, downloaded Nov. 23, 2005.
"Iomega Mini USB Drives", www.iomega.com, downloaded Nov. 23, 2005.
"Verbatim USB Drive Review: Store 'n' Go 512MB", www.audioholics.com, downloaded Nov. 23, 2005.
Gigabyte GO-U0128B 128MB USB Hard Drive Review—Pcstats.com, www.pcstats.com, downloaded Nov. 23, 2005.
"Lexar Media JumpDrive Classic USB Flash Drive with Lanyards, 128MB, 3 Pack", www.compusa.com, downloaded Nov. 23, 2005.
"USB Drive, USB Pen Drive, USB Flash Drive, USB Thumb Drive, Flash Drives, 512MB, 1GB, 2GB, 4GB, 8GB", www.supermediastore.com/usb-flash-drive-usb-flash-drives.html, downloaded Nov. 23, 2005.
"USB Drive, USB Pen Drive, USB Flash Drive, USB Thumb Drive, Flash Drives, 512MB, 1GB, 2GB, 4GB, 8GB", www.supermediastore.com/usb-flash-drive-usb-flash-drives-pen-drives.html, downloaded Nov. 23, 2005.
"USB Drive, USB Pen Drive, USB Flash Drive, USB Thumb Drive, Flash Drives, 512MB, 1GB, 2GB, 4GB, 8GB", www.supermediastore.com/usb-flash-drive-usb-flash-drives-pen-drives.html..., downloaded Nov. 23, 2005.
"USB Flash Drives, USB Pen Drives, Portable Memory, Shop for USB Flash Drives" www.flash-memory-store.com..., downloaded Nov. 23, 2005.
"Sony MicroVault 512MB USB 2.0 Flash Drive (00027242645561): Overview", www.dealtime.com..., downloaded Nov. 23, 2005.
"Philips KEY006 128MB MP3/WMA player/Thumb Drive with Neck Strap Remote", www.amazon.com..., downloaded Nov. 22, 2005.
Joybee 125 MP3 Player, 128MB, Orange (DA125-128MB-Orange), www.amazon.com..., downloaded Nov. 22, 2005.
"NEO PIX Live 256 Mb MP3 USB 2.0 USB key", www.pixmania.co.uk... downloaded Nov. 22, 2005.
"iRiver 1GBMP3 Player with FM Tuner", www.circuitcity.com..., downloaded Nov. 22, 2005.
"Sony Network Walkman Digital Music Player", www.circuitcity.com..., downloaded Nov. 22, 2005.
"Samsung 1GB USB Direct-Insert MP3 Player", www.circuitcity.com..., downloaded Nov. 22, 2005.
"Samsung 512MB Portable Digital Audio Player", www.circuitcity.com..., downloaded Nov. 22, 2005.
"iRiver 512MB MP3 Jukebox with Color Display", www.circuitcity.com..., downloaded Nov. 22, 2005.
"Samsung 512MB USB Direct-Insert MP3 Player", www.circuitcity.com..., downloaded Nov. 22, 2005.
"Creative Zen Nano 512MB MP3 Player (White)", www.circuitcity.com..., downloaded Nov. 22, 2005.
"SanDisk 512MB MP3 Player", www.circuitcity.com..., downloaded Nov. 22, 2005.
"YoYo-128MB", www.usb-mp3player.co.uk, downloaded Nov. 22, 2005.
"Aigo BY06-128MB", www.usb-mp3players.co.uk, downloaded Nov. 22, 2005.
"Sigmatel USB Mp3 Player", www.intomusic.co.uk/scipts/usb-mp3-wma-player.asp, downloaded Nov. 22, 2005.
"Transcend 256MB T. Sonic 610 USB MP3 Player", www.supermediastore.com..., downloaded Nov. 22, 2005.
"Apacer Audio Steno AS820 USB 512MB Flash Drive MP3 Player FM Radio Line-In MP3 Conversion Voice", www.supermidastore.com..., downloaded Nov. 22, 2005.
"Ennyah Digi Sound 701 Aluminum Case MP3 Player 212MB Silver", www.supermediastore.com..., downloaded Nov. 22, 2005.
"Artwizz HangPhones Earphones", http://shop.ipodworld.co.uk..., downloaded Jun. 27, 2005.
"Rio eStore", www.riohome.net/shop/bin... downloaded Jun. 15, 2005.
"PN10 512MB", www.iriveramerica.com..., downloaded Aug. 23, 2005.
"iDiddy", www.iddidy.com downloaded Aug. 24, 2005.
International Search Report dated Apr. 24, 2007 for International Application No. PCT/US2006/033186.
Written Opinion dated Apr. 24, 2007 for International Application No. PCT/US2006/033186.

* cited by examiner

LANYARD FOR HANDHELD ELECTRONIC DEVICE

CROSS REFERENCE TO RELATED APPLICATIONS

This application is related to the following applications, all of which are herein incorporated by reference:

U.S. Design patent application No. 29/237,691, titled "LANYARD";

U.S. Design patent application No. 29/220,015, titled "ELECTRONIC DEVICE HOLDER"; and U.S. Design patent application No. 29/257,103, titled "CLASP".

BACKGROUND OF THE INVENTION

1. Field of the Invention

The present invention relates generally to lanyards for handheld electronic devices. More particularly, the present invention relates to a lanyards that incorporate electronic circuitry.

2. Description of the Related Art

A lanyard is a rope or cord often worn around the neck or wrist to carry something. For example, lanyards may refer to straps or cords that are attached to an article such as a firearm, whistle, or placard and worn around the neck or shoulder to prevent loss of the article. In some cases, the lanyard may include a clip for securing the article to the cord. Recent examples of lanyards are cords that include clips that hold a badge associated with a tradeshow, or cords that include clips that hold electronic identification cards for allowing entry into rooms. Lanyards have also been used to attach an ignition safety switch of a water craft such as a jetski to the operators wrist. Similarly, in exercise equipment, a lanyard may be used to attach a stop or deceleration device of a treadmill to the operator.

A lanyard for handheld electronic devices is desired.

SUMMARY OF THE INVENTION

The invention relates, in one embodiment, to an apparatus for use with a portable electronic device. The apparatus includes a neck cord having at least one data carrying element. The at least one data carrying element has a first end and a second end. The apparatus also includes an electrical connector physically coupled to the neck cord and electrically coupled to the first end of the at least one data carrying element. The apparatus further includes at least one output device electrically connected to the second end of the at least one data carrying element.

The invention relates, in another embodiment, to a wearable electronic apparatus. The apparatus includes a neck cord having at least one data carrying element. The at least one data carrying element has a first end and a second end. The apparatus also includes a portable electronic device physically supported by the neck cord and electrically coupled to the first end of the at least one data carrying element. The apparatus further includes at least one output device electrically connected to the second end of the at least one data carrying element.

The invention relates, in another embodiment, to a kit for facilitating wearing an electronic device around one's neck. The kit includes a portable electronic device capable of being wearable or handheld. The kit also includes an apparatus capable of supporting the portable electronic device around the user's neck. The apparatus includes at least a neck cord having at least one data carrying element. The at least one data carrying element has a first end and a second end. The apparatus also includes at least an electrical connector physically coupled to the neck cord and electrically coupled to the first end of the at least one data carrying element. The apparatus further includes at least one output device electrically connected to the second end of the at least one data carrying element.

The invention relates, in another embodiment, to a lanyard for an electronic device. The lanyard includes an electronic device holder that physically and operatively mates with a handheld electronic device. One or more signals is transferred between the electronic device holder and the handheld electronic device when mated. The lanyard also includes a cord attached to the electronic device holder, and forming a loop for placement around a user's neck. The cord carries one or more signals between the electronic device holder and a peripheral I/O device operatively coupled to the cord.

The invention relates, in another embodiment, to a lanyard for an electronic device. The lanyard includes a flexible neck cord forming a loop for placement around a user's neck. The lanyard also includes an electronic device holder supported by the flexible neck cord such that the electronic device holder hangs from the flexible cord. The electronic device holder includes a connector for anchoring an electronic device to the flexible neck cord. The connector includes at least one electrical contact that comes into electrical engagement with a corresponding contact located on the electronic device when the electronic device is secured to the electronic device holder. The lanyard further includes an electrical wire having a proximal end connected to the electrical contact, and a distal end that extends to a head piece worn on the user's head. The electrical wire emanates from the electronic device holder and runs at least partially along the flexible neck cord.

The invention relates, in another embodiment, to a lanyard for an electronic device. The lanyard includes a connector unit that mechanically and electrically couples to a handheld electronic device. The connector unit includes at least an audio connector that interfaces with a corresponding audio connector of the handheld electronic device when the handheld electronic device and connector unit are coupled together. The lanyard also includes a pair of cords that form a loop for placement on a person's neck. A first cord is fixed to and emanates from a first side of the connector unit. A proximal end of the first cord is electrically connected to the audio connector of the connector unit, and a distal end is electrically connected to a first earphone. A second cord is fixed to and emanates from a second side of the connector unit. A proximal end of the second cord is electrically connected to the audio connector of the connector unit, and a distal end is electrically connected to a second earphone. The lanyard further includes a clasping arrangement that includes a pair of clasps. A first clasp is fixed to the second cord between the proximal and distal ends of the second cord. A second clasp is fixed to the first cord between the proximal and distal ends of the first cord. The first clasp slides over the first cord between the proximal end of the first cord and the second clasp, and the second clasp slides over the second cord between the proximal end of the second cord and the first clasp. The clasps slide along their respective cords in order to adjust the size of the loop formed by the first and second cords. The clasps further provide a retaining force on their respective cords in order to hold the position of the cords when a desired size is found.

The invention relates, in another embodiment, to a lanyard. The lanyard includes a neck cord which is worn around the neck. The lanyard also includes a connector unit physically carried on the neck cord and configured to releasably engage a portable media player. The connector unit intimately and rigidly mates with the portable media player so that the portable media player is an extension of the connector unit when engaged thereto. Furthermore, the neck cord and connector unit are configured with data carrying capabilities so that signals can be passed from the portable media player to one or more output devices when the portable media player is engaged with the connector unit.

BRIEF DESCRIPTION OF THE DRAWINGS

The invention may best be understood by reference to the following description taken in conjunction with the accompanying drawings in which.

DETAILED DESCRIPTION OF THE INVENTION

Figure 1:
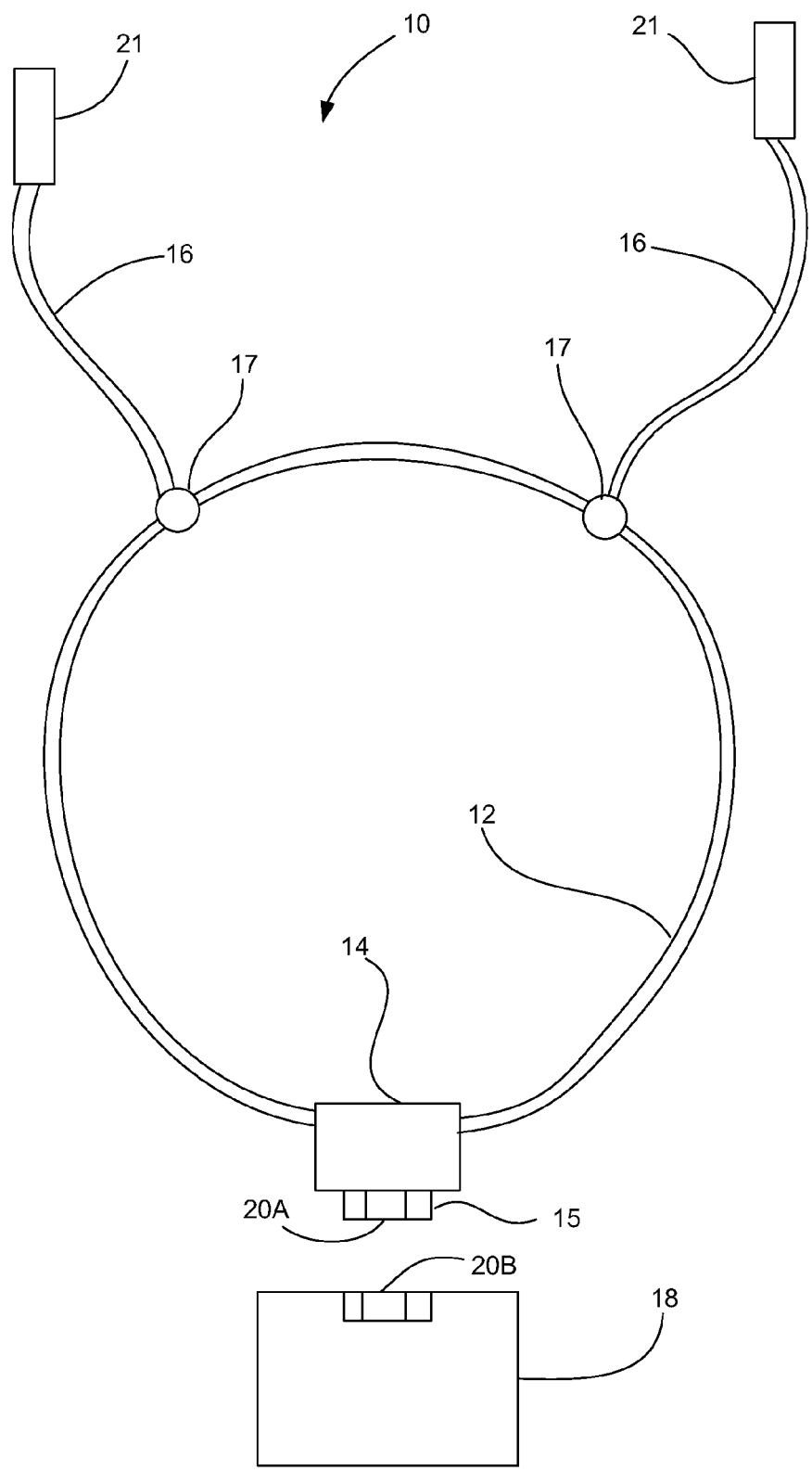
FIG. 1 is a diagram of a lanyard, in accordance with one embodiment of the present invention.

In recent years portable electronic devices have become small, light and powerful. One factor contributing to this phenomenon is in the manufacturer's ability to fabricate various components of these devices in smaller and smaller sizes while in most cases increasing the power and or operating speed of such components. Because of their decreased size and weight, the portable electronic devices are easily transportable and thus they may be carried by people when performing physical activities such as walking, running, cycling, stair climbing, etc. In some cases, the devices are held in the user's hand, while in other cases the devices are worn by the user thus freeing their hands. Devices that fall under this category include, for example, cell phones, PDAs, and media players.

The invention pertains to improved approaches for carrying or wearing portable electronic devices. One aspect of the invention relates to making the portable electronic devices easier to wear or strap to the body of the user. For example, by utilizing a neck cord the portable electronic device can be supported by the user's neck. As a result, the device is easy to transport and manipulate when on the go. Another aspect of the invention relates to improved approaches for managing wires or cables emanating from the portable electronic device. As should be appreciated, cables such as those used to output data (e.g., earphones), can get in the way and sometimes become tangled up in the users hands, arms or legs during activity.

In one embodiment, an apparatus for facilitating carrying or wearing a portable electronic device makes use of a neck cord having data carrying capabilities. The apparatus can also include an input or output device that can be electrically connected to receive the data being carried by the neck cord. The apparatus can also include an electrical connector to physically and electrically couple the portable electronic device to the neck cord.

In another embodiment, an apparatus for facilitating carrying or wearing a handheld electronic device can be referred to as a lanyard. A lanyard, in this embodiment, includes a neck cord (or necklace or neck chain) which is worn around the neck and an electronic device holder (e.g., anchoring mechanism) disposed on the neck cord for removably securing a handheld electronic device to the neck cord. The neck cord and electronic device holder include data carrying capabilities so that signals can be passed from the handheld electronic device to another electrical device via the neck cord. By way of example, the electrical device may be one or more output devices such as a pair of earphones that operatively couple to the neck cord.

A handheld electronic device may, for example, correspond to a media player. One example of a media player is a music player, such as a digital music player (e.g., MP3 player). Examples of music players are the iPod series of music players manufactured by Apple Computer of Cupertino, Calif.

Embodiments of the invention are discussed below with reference to FIGS. 1-6. However, those skilled in the art will readily appreciate that the detailed description given herein with respect to these figures is for explanatory purposes as the invention extends beyond these limited embodiments.

FIG. 1 is a diagram of a lanyard 10, in accordance with one embodiment of the present invention. The lanyard 10 includes a neck cord 12, an electronic device holder 14 disposed on the neck cord 12, and one or more cables 16 emanating from the neck cord 12. The cord 10 is formed as a loop for placement around a person's neck. The cord 12 may have a fixed length or it may be adjustable to accommodate different user preferences or usages.

The electronic device holder 14 is configured to releasably engage a handheld electronic device 18 such as a music player. That is, the electronic device holder 14 is capable of attaching to the handheld electronic device 18 so that the handheld electronic device 18 can be carried by the cord 12 and supported by the neck when the cord 12 is placed around the neck. When attached, the electronic device holder 14 intimately and rigidly mates with the handheld electronic device 18, i.e., makes a one to one connection such that the handheld electronic device 18 is an extension of the electronic device holder 14. A direct physical connection between the electronic device holder and handheld electronic device helps reduce cable clutter that would otherwise be created with wire support harnesses spanning between the two.

The electronic device holder 14 can, for example, include a mechanical holding feature 15 that utilizes such elements as buttons, latches, snaps, hooks, tabs, flanges, lips, catches, detents and/or friction couplings for quickly and conveniently securing and releasing the handheld electronic device 18 to the electronic device holder 14.

The cord 12 and electronic device holder 14 are both configured to carry signals to or from the handheld electronic device 18. For example, the electronic device holder 14 may include a connector 20A such as an audio jack, video jack and/or a data connector that couples with corresponding connector 20B on the handheld electronic device 18 (or vice versa). The connectors 20 may be combined with the mechanical holding features 15 and/or they may be separate components. In either case, the signal carrying connection is made when the handheld electronic device is attached to the electronic device holder 14. A direct physical connection such as this helps reduce cable clutter that would otherwise be created with cables spanning between the two.

Furthermore, the cord 12 may include a signal carrying conduit such as one or more wires or cables that connect to the connector 20 of the electronic device holder 14 and that transport or carry signals between the connector 20 and the one or more cables 16 emanating from the cord 12. By routing signals through the cord 12, dangling cords can be substantially eliminated. The signal carrying conduit may for example be one or more conductive wires and/or optical fibers.

In one embodiment, the neck cord 12 converges within the electronic device holder 14 such that the electronic device holder 14 hangs from the neck cord 12. The neck cord 12 may be segmented or one continuous piece that is placed inside opposing holes of the electronic device holder 14. Inside the electronic device, the neck cord 12 may be structurally attached to the electronic device holder 14, and the signal carrying conduits may be routed from the cord 12 to the appropriate contacts points of the connector 20.

The cables 16 in turn are configured to carry signals between the cord 12 and one or more electrical components 21 such as earphones, microphones, video displays, etc that are disposed at the end of the cables 16. The cables 16 form a short extension from the neck cord to the user's head thereby reducing the amount of cabling that is needed. In one implementation, the cables 16 are integral with the cord 12. For example, the cables 16 may be an extension of the signal carrying wires or cables contained within the neck cord 12. In another implementation, the cables 16 interface with the wires or cable of the cord 12 through some sort of connection interface or node 17 including both hard wired interfaces (e.g., solder) and pluggable interfaces (e.g., port/jack). In some cases, the position of the nodes 17 may be slidably adjustable along the length of the cord 12. By adjusting the position of the nodes, cable clutter may be reduced.

In one particular embodiment, the connector 20 of the electronic device holder 14 includes at least an audio jack for insertion into an audio plug of the handheld electronic device 18, and the cord 12 includes an electrical wire for carrying audio signals from the handheld electronic device 18 to the cables 16. Each of the cables 16 in turn includes a wire for carrying the audio signals from the cord 12 to an audio output device such as an earphone. The cord 12 may, for example, include one or more conductive wires that are distributed at least partially within the cord 12. These wires can then extend outside of the cord 12 and become the cables 16 themselves or be within the cables 16. Instead of conductive wires, the cord and cables may alternatively include optical fibers or other data transmitting medium.

It should be noted that one advantage of the lanyard 10 of FIG. 1 is that it does not include a wire support harness or electrical cabling between it and the handheld electronic device. The only connection points are between the cord 12 and the electronic device holder 14 and the electronic device holder 14 and the handheld electronic device 18. No other support elements are used. The amount of dangling lines is therefore minimized and a more rigid structure is created. It should be appreciated, however, that this is not a limitation and that is some cases it may be desirable to use a separate wire support harness and/or electrical cabling.

FIGS. 2A, 2B, 3 and 4 are diagrams of a lanyard 100, in accordance with another embodiment of the present invention. The lanyard 100 may for example correspond to the lanyard 10 shown in FIG. 1. The lanyard 100 includes a connector unit 102 that mechanically and electrically couples to a handheld electronic device 104. The handheld electronic device 104 may, for example, correspond to a media player, such as an iPod® media player manufactured by Apple Computer of Cupertino, Calif. Media players are often used to play music for the benefit of its user.

The connector unit 102 includes an audio connector 106 that interfaces with a corresponding audio connector of the handheld electronic device 104 when the handheld electronic device 104 and connector unit 102 are coupled together. As an example, the audio connector 106 can be an audio jack and the corresponding audio connector may be an audio port (or vice versa). In one example, the audio connector 106 is a jack with a proximal end embedded in a plastic body of the connector unit 102. In this example, the audio jack protrudes distally from a top or bottom side of the handheld electronic device 104, and the bottom side of the handheld electronic device 104 includes a coinciding audio port for interfacing with the audio jack. As such, the handheld electronic device 104 hangs upside down when connected to the lanyard 100. This allows a user to easily manipulate the handheld electronic device when worn around their neck.

Figure 2A:
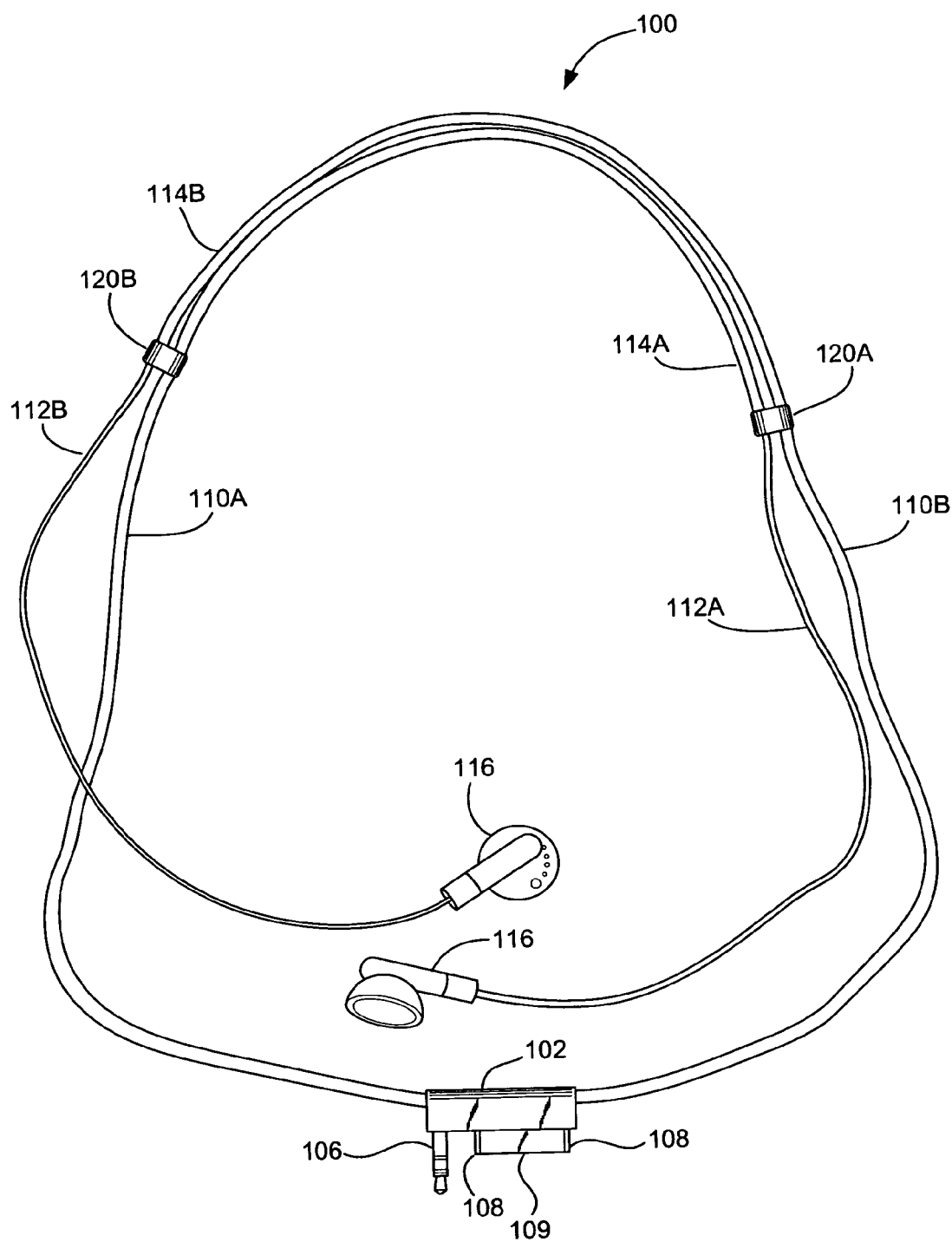
FIG. 2A is a top perspective diagram of a lanyard, in accordance with one embodiment of the present invention.
Figure 2B:
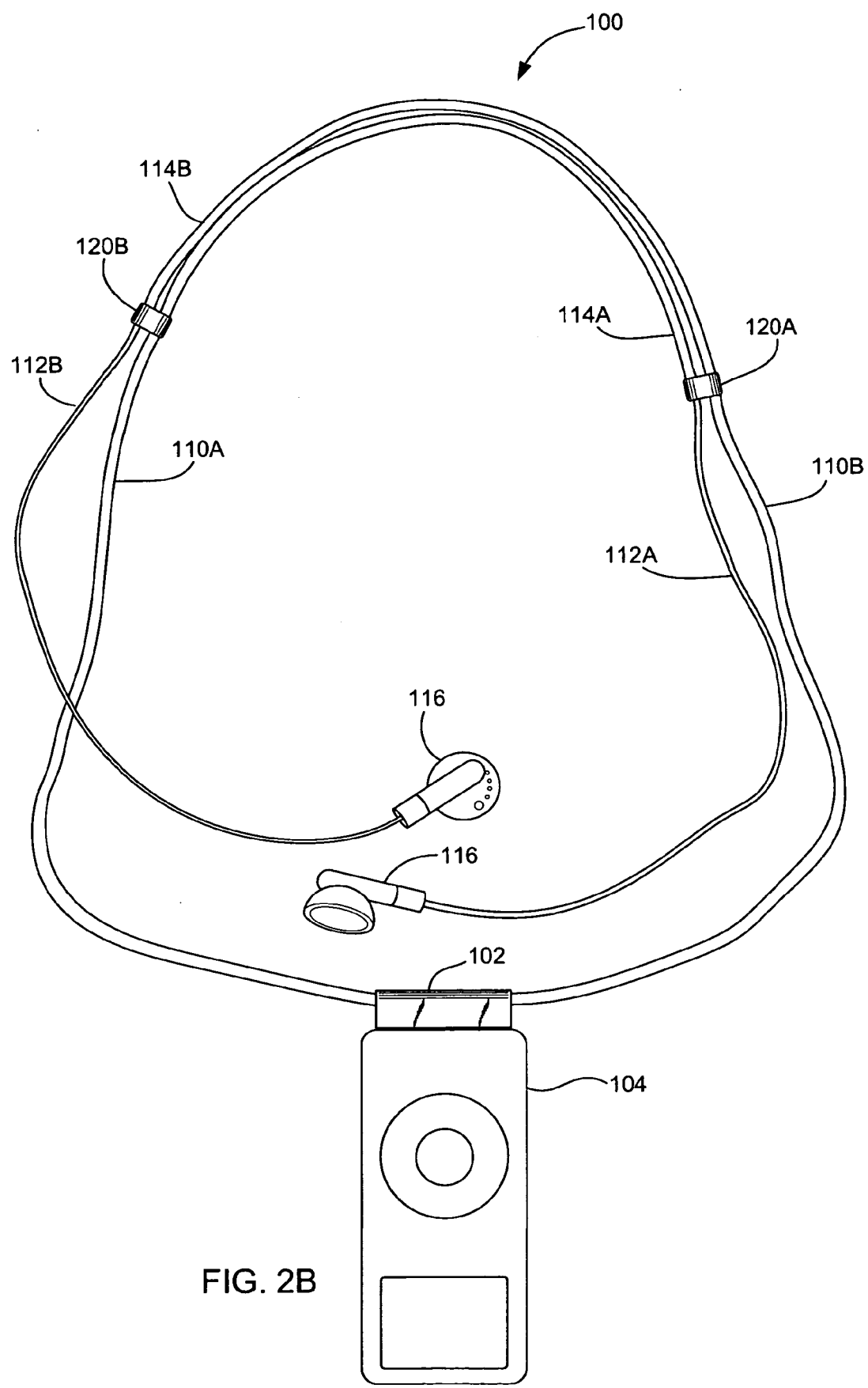
FIG. 2B is a top perspective diagram of the lanyard of FIG. 2A with a handheld electronic device mounted thereon, in accordance with one embodiment of the present invention.

The connector unit 102 serves to couple the handheld electronic device 104 to a pair of cords 110A and 110B, thereby allowing the lanyard 100 to support the handheld electronic device 104. FIG. 2b illustrates the handheld electronic device 104 being supported by the lanyard 100. The connector unit 102 can use a variety of techniques to mechanically couple the handheld electronic device 104 to the connector unit 102. For example, friction, detents, latches and/or catches can be utilized to secure the handheld electronic device 104 to the connector unit 102. The mechanical coupling is secure yet not permanent so that the user can attach the handheld electronic device 104 to the connector unit 102 and have it remain attached while being worn or carried. However, the user can also conveniently decouple the handheld electronic device 104 from the connector unit 102.

In one embodiment, the connector unit 102 includes a mechanical retention feature 108 that engages a corresponding mechanical retention feature of the handheld electronic device 104 when the handheld electronic device 104 and connector unit 102 are coupled together. In some cases, the mechanical retention feature is positioned on a connector 109 that mates with a corresponding connector on the handheld electronic device 104. The connector 109 may be an electrical connector with one or more contacts or a dummy connector with a connector body but no contacts (as shown).

When secured, the handheld electronic device 104 is held and supported (at least in part) by the connector unit 102. The mechanical retention feature may for example be one or more flexures that provide a biasing force against the walls of the connector of the handheld electronic device. In one implementation, the connector unit 102 includes flexures on each side of the connector 109. The flexures may include detents designed to interact with receptacles located within the connector of the handheld device thereby further securing the connector unit to the handheld device (e.g., force detent coupling). The detent springs into the receptacles thereby securing the two devices together. In some cases, the coupling may be angled to further secure the connection. An example of a similar coupling may be found in U.S. patent application Ser. No. 10/799,403, which is herein incorporated by reference.

One advantage of such a coupling is that the connection may be made without actuating latches or buttons. For example, the connector may be pushed into and pulled out of the corresponding connector without actuating any mechanism. All that needs to be done is overcome the holding force of the detent flexure.

Although latches and buttons are not used in the illustrated implementation, it should be appreciated that this is not a limitation and that latches and buttons may be used. For example, a button may be used to engage and release a holding detent rather than utilizing a spring loaded flexure.

In some cases, the audio connector 106 may also provide or assist in the providing of the mechanical coupling. In one implementation, both the audio connector 106 and the connector 109 contribute to providing a mechanical retention feature.

As shown, the pair of flexible cords 110A and 110B form a loop for placement around a user's neck. The first cord 110A is fixed to and emanates from a first side of the connector unit 102, and a second cord 110B is fixed to and emanates from a second side of the connector unit 102. Furthermore, the first and second cords 110A and 110B are coupled together via an adjustable clasping system 120. The connector unit 102 therefore hangs from the cords 110.

Each of the cords 110A and 110B includes an inner wire conduit 112 and an outer sheath 114 that surrounds the inner wire conduit 112 and that extends longitudinally over a proximal portion of the inner wire conduit 112 disposed therein. As shown, cord 110A includes inner wire conduit 112A and outer sheath 114A that covers at least a longitudinal portion of the inner wire conduit 112A. Furthermore, cord 110B includes inner wire conduit 112B and outer sheath 114B that covers at least a longitudinal portion of the inner wire conduit 112B.

The inner wire conduits 112A and 112B allow audio data in the form of electrical signals to be distributed through the cords 110A and 110B from the handheld electronic device 104 to the earphones 116. The inner wire conduits 112A and 112B may, for example, be one or more conductive wires surrounded by a flexible insulation material such as plastic. The proximal end of the inner wire conduits 112A and 112B are operatively coupled to the audio jack 106. At least one conductive wire of the inner wire conduit 112A of the first cord 110A is connected to a first contact of the audio jack 106, and at least one conductive wire of the inner wire conduit 112B of the second cord 110B is connected to a second contact of the audio jack 106 (e.g., left and right channels). An additional wire in each of the wire conduits 112 may be used for ground. In addition, the distal end of the inner wires 112 are operatively coupled to individual earphones 116, such as earbuds and headsets. The connections may be made similarly to the audio jack.

The flexible outer sheaths 114A and 114B may serve as a soft flexible outer layer that provides a better feel to the user's neck. The flexible outer sheaths 114A and 114B may also protect the inner wire conduits and provide strength to the cords 110A and 110B. That is, they may serve to better support weight of the handheld electronic device 104 when it is hanging from the cords 110A and 110B, i.e., strengthens the cords 110A and 110B and reduces stresses at the connection points between the inner wires 112A and 112B and the audio jack 106. The outer sheathes 114A and 114B may, for example, be formed from a woven material, such as woven cotton, nylon and polyester. Alternatively, the outer sheath 114 may be formed from a plastic or foam like material.

Figure 3:
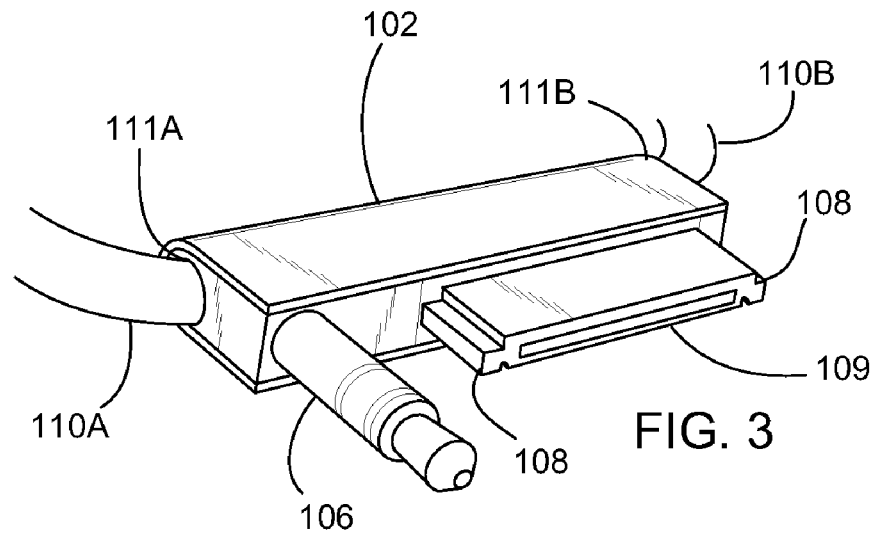
FIG. 3 is a perspective diagram of a connector unit, in accordance with one embodiment of the present invention.

The proximal end of the cords 110A and 110B can be attached to the connector unit 102 using a variety of techniques. In the illustrated embodiment, as shown in FIG. 3, the proximal end of the cord 110A is inserted into a hole 111A on the first side of the connector unit 102 such that the proximal end is disposed inside the connector unit 102. Inside the connector unit 102, the inner wires 112A are electrically attached to the audio connector 106, and the outer sheath 114A is anchored to a body of the connector unit 102. For example, the conductor of the inner wire 112A may be connected directly to the corresponding contact of the audio connector 106 using solder or other suitable technique, or indirectly through an electrical circuit (e.g., flex circuit, printed circuit board, connector), which is housed within the connector unit 102. Furthermore, the outer sheath 114A may be anchored to the body of the connector unit 102 using a variety of techniques including but not limited to fusing, molding, epoxies, glues, clamps, teeth, clasps, etc. The same techniques can be used to attach the proximal end of cord 110B through a hole 111B on the second side of the connector unit 102.

The lanyard 100 also includes a pair of adjustable clasps 120A and 120B for adjusting the length of the cords 110A and 110B so as to effect the size of the loop. The size of the loop may be adjusted to fit around necks of various sizes and shapes, and at different depths. The first clasp 120A is fixed to the first cord 110A between the proximal and distal ends of the first cord 110A. The second clasp 120B is fixed to the second cord 110B between the proximal and distal ends of the second cord 110B. In most cases, the outer sheathes 114A and 114B extends longitudinally from the proximal end of the cords 110A and 110B to the respective clasps 120A and 120B, such that the inner wires 112A and 112B are exposed between the clasps 120A and 120B and the distal end of the cords 110A and 110B at the earphones 116A and 116B, i.e., does not include the sheathes 114A and 114B. The outer sheathes 114A and 114B may be fixed to the clasps 120A and 120B using a variety of techniques including but not limited to fusing, molding, epoxies, glues, clamps, teeth, clasps, etc.

In order to allow loop adjustments, the clasps 120A and 120B are configured to slidably receive the opposite cord 110A and 110B. The first clasp 120A slidably receives the second cord 110B between the proximal end of the second cord 110B and the second clasp 120B. The second clasp 120B slidably receives the first cord 110A between the proximal end of the first cord 110A and the first clasp 120A. The clasps 120A and 120B are configured to slide along their respective cords 110A and 110B in order to adjust the size (e.g., diameter) of the loop formed by the first and second cords 110A and 110B. The diameter of the loop becomes smaller when the clasps 120A and 120B are slid towards each other, and becomes larger when the clasps 120A and 120B are slid away from one another. The clasps 120A and 120B are configured to provide a retention force on their respective cords 110A and 110B in order to hold the position of the cords 110A and 110B when a desired diameter is found. The retention force may be provided using a variety of techniques including for example quick release spring clamps and friction force couplings.

Figure 4:
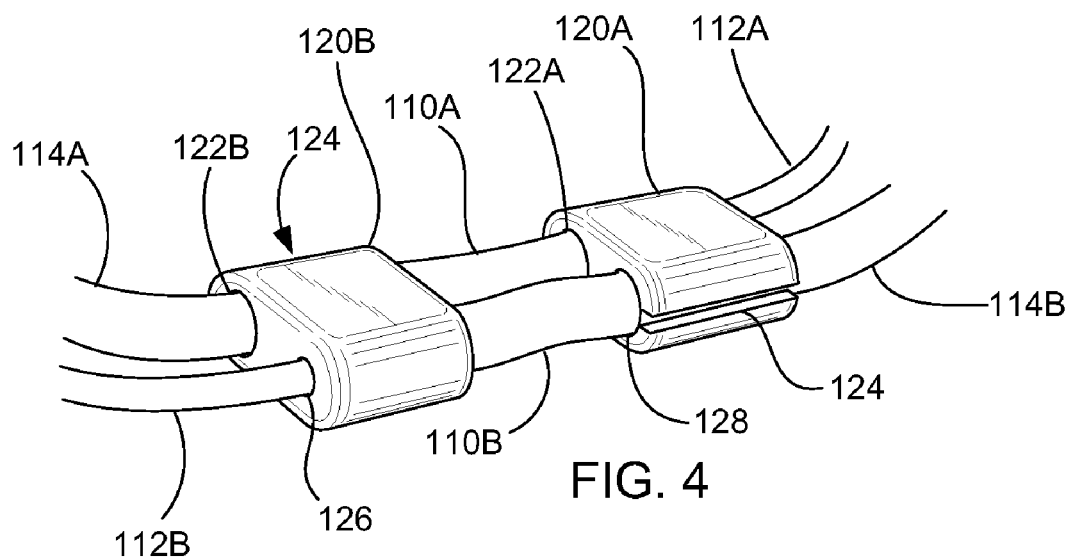
FIG. 4 is a perspective diagram of a clasp system, in accordance with one embodiment of the present invention.

In the illustrated embodiment of FIG. 4, the clasps 120A and 120B each include a through hole 122 that receive the opposite cord 110 therethrough, i.e., the through hole 122 allows the clasps 120 to slide along the cords 110. Clasp 120A includes through hole 122A that receives cord 110B and clasp 120B includes through hole 122B that receives cord 110A. The through holes 122A and 122B are sized and dimensioned to allow sliding, but also to provide a friction force on the respective cords 110A and 110B when the sliding is stopped. For example, in one implementation, when the cords 110A and 110B are pulled parallel to the axis of the through holes 122A and 122B, the cords 110A and 110B can elongate and become thinner thereby allowing cords 110A and 110B to be slid through the clasps 120A and 120B, and when the cords 110A and 110B are released, they go back to their original shape, i.e., become thicker, thereby trapping cord 110A in the through hole 122B and cord 110B in the through hole 122A. Although described as being pulled together, it should be noted that the cords may also be selectively slid relative to the other.

The clasps 120 further include a passage that is juxtaposed relative to the through holes 122 and that consists of stepped holes 126 and 128. The hole 126 receives the inner wire 112 therethrough and the hole 128 receives the entire cord 110 including the inner wire 112 and the outer sheath 114, i.e., the outer sheath ends in the hole 128. The sheath 114 may be attached to the clasp 120 using a variety of techniques including those mentioned previously with respect to the connector unit 102.

In one embodiment, the clasps 120 include a safety feature that allows the cords to be disengaged from the clasps thereby eliminating the loop that surrounds the neck. As shown in FIG. 4, the safety feature is embodied as a slit 124 that is made in the clasp 120 along the through hole 122. The slit 124 is sized and dimension to keep the cord 110 inside the through hole 122 under normal conditions, but when a large force is applied to the cord 110 allows the cord 110 to be pulled out of the through hole 122. When pulled out of the through hole 122, the cords 110 are no longer attached to one another and are freed such that a loop is no longer present.

A lanyard can also serve as a hub for operatively interfacing with the handheld electronic device. In fact, the connector unit 102 may be configured to extend the functionality of the handheld electronic device 104 coupled thereto or to provide a physical user interface that allows more convenient control of the handheld electronic device 104 when the user is wearing the handheld electronic device 104.

The connector unit 102 may for example include input mechanisms such as buttons, dials, sliders, navigation pads, etc that allow a user to interact with the handheld electronic device 104 via the lanyard 100. In the case of a music player, the connector unit may include button controls for volume, play/pause and playing the next or previous songs. As a result, the user does not need to use the user interface from the handheld electronic device 104, which can be difficult when the user is on the go as for example when the user is exercising. Alternatively or additionally, the input mechanism may correspond to touch sensing devices such as touch pads, touch screens or touch sensitive housings. Examples of such devices can be found in U.S. patent application Ser. Nos. 10/188,182, 10/643,256, 10/840,862, 10/903,964, 11/038, 590, 11/057,050, and 11/115,539, which are herein incorporated by reference.

The connector unit 102 may also include output mechanisms such as indicators, speakers, displays, haptics devices, etc, that provide additional information to the user. In the case of music player, a speaker may be used to output sound to the user's surroundings rather than or in addition to earphones. Furthermore, color indicators (e.g., strobe) and vibrators (e.g., bass) may be used to enhance the feel of the music. For example, color indicators and vibrators may be configured to emulate the flow of the music. Moreover, a display may be used to add display functionality to a music player that is embodied without a display. An example of a music player without a display can be found in U.S. Patent Application No. 60/642,276, which is herein incorporated by reference.

The connector unit 102 may also include sensors such as a heart monitor, light sensor, temperature sensor, motion sensor (e.g., accelerometer), etc. that provide external information about the user or the user's surroundings that can be used by the handheld electronic device. Examples of sensors that can be used may be found in U.S. patent application Ser. Nos. 10/402,311, 10/997,479, 60/658,777, and 60/663,345, which are herein incorporated by reference.

The connector unit 102 may also include additional ports, jacks, connectors so that additional peripheral devices can be coupled to the handheld device (e.g., audio, video, data, power, etc.). In some cases, the connector unit 102 may even include a wireless interface so that the handheld device can remotely communicate with other devices. In the case of a music player, the connector unit 102 may for example allow the user to broadcast music to other music players. An example of music broadcasting can be found in U.S. patent application Ser. No. 10/423,490, which is herein incorporated by reference.

The connector unit 102 may also include a battery for providing additional power to the handheld electronic device thereby extending its life when used remotely as for example when worn around the neck.

The connector unit 102 may also include a memory unit such as flash memory for providing additional memory to the handheld electronic device. In the case of the music player, the memory unit may contain additional lists of songs as for example songs, which are better associated with wearing the music player around the neck. The memory unit may for example include an exercise playlist that is tied to a particular workout.

The connector unit 102 may also include a processor that helps control interactions between the above mentioned devices carried by the connector unit 102 and the handheld electronic device 104. The processor may also include additional control functionalities not offered by the handheld electronic device 104. For example, the connector unit 102 may provide telephonic functionality to a handheld electronic device that does not normally have such functionality. In fact, to go along with this new processing capability, the connector unit 102 may even include a numeric or alphanumeric keypad so that the user can easily and conveniently make inputs associated with this new functionality.

In one particular embodiment, the connector unit 102 and/or the cord 110 are capable of being illuminated so as to affect a color change. As a result, these elements can be used to indicate events or status of the handheld held electronic device 104. These elements may also indicate variables associated with the user as for example temperature, heart rate, speed, etc. In the case of heart rate, the color red may indicate when the user is reaching an upper limit of a heart rate threshold while the color blue may be indicate when the user is reaching a lower limit of the heart rate threshold. These elements may also be used to provide illumination at night (safety beacon) or to enhance the feel of music being outputted by the handheld electronic device, i.e., they can change color or provide visual effects according to the music (strobe, blinking, fading in and out). See for example U.S. patent application Ser. No. 10/889,933, which is herein incorporated by reference.

The illumination can be widely varied. In one implementation, the cords 110 include a translucent or semi-translucent outer sheath and fiber optic wires disposed therein along with the inner wire. In some cases, the fiber optic wires completely surround the inner wire so as to hide the inner wire while in other cases, the fiber optic wires only partially surround the inner wire. The optical fibers can be controlled separately and selectively using separate LEDs located within the connector unit 102 or by a single LED located within the connector unit 102. In another implementation, the connector unit 102 includes an illuminable shell and a light source such as an LED therein. The internal light source shines light on the illuminable shell thereby causing the illuminable shell to glow in the color of the light. Examples of light systems may be found in U.S. patent application Ser. Nos. 10/075,964, 10/075,520 and 10/773,897, which are herein incorporated by reference.

In yet another embodiment, the connector unit 102 may include functional components of other types of electronic devices so that the handheld electronic device can operate as another type of electronic device. For example, it may include software and hardware that is different than the software and hardware of the handheld electronic device 104, but works with the handheld electronic device 104 to extend its functionality (e.g., creating a multifunctional device). By way of example, the connector unit 102 may include functional components associated with cell phones, PDAs, GPS units, remote controls and media players. In the case of a connector unit with cell phone functionality, for example, the connector unit 102 may include an antenna, transceiver, and keypad.

Although the various embodiments noted above use an anchoring mechanism, such as the connector unit 102, to attach a handheld electronic device can be referred to a lanyard, it should be noted that in another embodiment the handheld electronic device can be permanently affixed to the cord of the lanyard or the anchoring mechanism can be part of the handheld electronic device.

Furthermore, although the connector 109 of the connector unit 108 is primarily shown as a key that snaps into the portable electronic device, the support means may take other forms including sacks, skins, and shells, that partially or entirely surround the portable electronic device so as to secure the portable electronic device to the cord. In either case, the support means typically includes openings that allow a user to interact with user interface of the portable electronic device. Although it should be pointed out that this is not a requirement as for example in embodiments where the user interface is extended to the support means itself. The sacks, skins or shells may be formed from elastic or rigid materials. In one implementation, the skin is formed from an elastic material that conforms to the shape of the portable electronic device, i.e., can be stretched over the portable electronic device. By way of example, the skin may be formed from a woven or mesh like material, a foam like material or an elastic plastic or rubber material. In another implementation, the shell is formed from a substantially rigid plastic material such as polycarbonate. In cases such as this, the shell may be divided into two parts that are hinged together. When the portable electronic device is placed in one side of the shell, the other side is closed thereby placing the portable electronic device inside the shell. In all of these alternatives, the support means typically includes a connector so that the portable electronic device may be operatively coupled to the cord.

Figure 5:
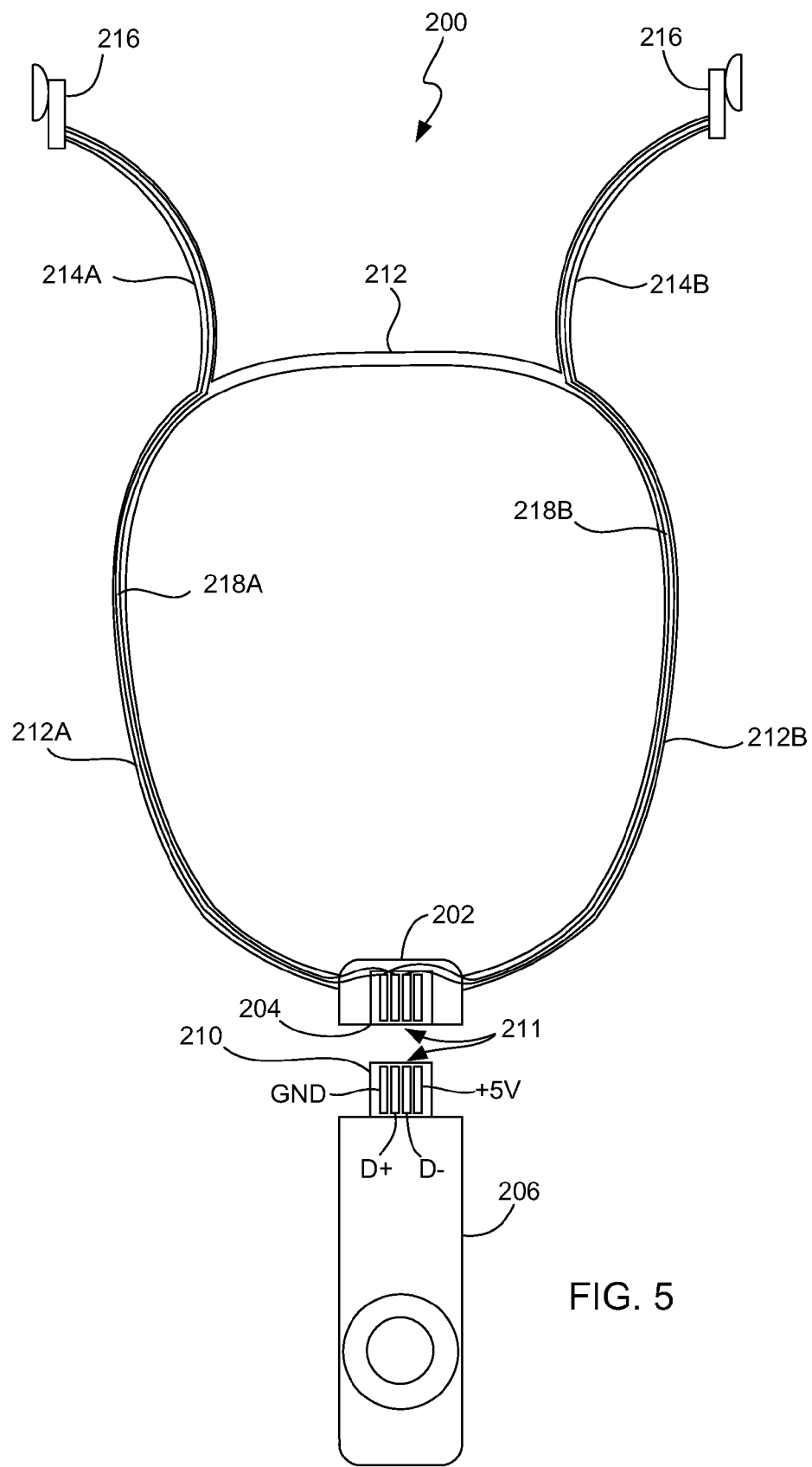
FIG. 5 is a simplified top view of a lanyard, in accordance with another embodiment of the present invention.

FIG. 5 is a simplified top view of a lanyard 200, in accordance with another embodiment of the present invention. In this embodiment, a connector unit 202 of the lanyard 200 includes a first connector 204 and a portable electronic device 206 that couples with the lanyard 200 includes a second connector 210 that mechanically and electrically engages the first connector 204. The first and second connectors 204 and 210 are configured for physical engagement and may include male/female interface. For example, the connectors 204 and 210 may be inserted into one another and may be secured via a friction coupling at the wiping surfaces between the two connectors 204 and 210. Furthermore, each connector 204 and 210 includes at least some coinciding electrical contacts 211 that mate together when the connectors 204 and 210 are secured together. The contacts 211 may be used to transmit data and/or power between the connector unit 202 and the portable electronic device 206. By way of example, the connectors may be USB or Firewire connectors, both of which have data and power transmitting capabilities. It should be appreciated, however, that this is by way of example and that other types of connectors may alternatively be used.

The lanyard 200 further includes a cord 212 that is attached to the connector unit 202. The cord 212 forms a loop and includes a pair of extension tentacles 214 extending therefrom. The cord 212 and tentacles 214 cooperate to carry signals between the connector unit 202 and an I/O device 216 located at the ends of the tentacles 214. The cord 212 allows the connector unit 202 to be worn around a user's neck, and the tentacles provide a short path from the cord to the head of the user (thereby reducing dangling cables). By way of example, the cord and tentacles may include one or more conductive wires therein.

In accordance with one embodiment, the portable electronic device includes music playing capabilities. As such, the extension tentacles 214 include earphones 216 at their ends that allow a user to listen to music being played on the portable electronic device. In order to provide stereo sound, a first side of the cord 212A and a first extension finger 214A of the lanyard 200 include therein a first set of conductive wires 218A for transmitting a right audio channel from the first connector 204 to the earphones 216. Furthermore, a second side of the cord 212B and a second extension finger 214B of the lanyard 200 include therein a second set of conductive wires 218B for transmitting a left audio channel from the first connector 204 to the earphones 216. The first and second sets of conductive wires may for example include a driving line and a ground line. The ground lines may be coupled to the same ground conductor of the connector unit 202, and the driving lines may be coupled to different audio signal carrying lines of the connector unit 202.

In one embodiment, the first connector 204 of the connector unit 202 is a modified female USB connector and the second connector 210 of the portable electronic device 206 with music playing capabilities is a standard male USB connector. The first connector 204 makes use of three of the at least four USB conductors to provide an electrical connection between the portable electronic device 206 and the earphones 216. The at least four conductors of the USB connector typically include ground, power and two signal carrying conductors. In one implementation, the USB ground is used as the ground for both earphones 216 and the USB signal carrying lines D+ and D− are used for the right and left audio signals. The audio signals are conveyed through the USB connection and through the lanyard 200 to the earphones 216.

Unlike the first connector 204 of the connector unit 202, the second "standard" USB connector 210 on the portable electronic device 206 serves two purposes: 1) it serves as the main interface to a host computer that includes a standard USB port for upgrades and transferring data (e.g., music) between the host computer and the portable electronic device (e.g., file transfer) and 2) it provides audio output to the lanyard via the first connector, cord, tentacles and earphones. Because these are mutually exclusive tasks, the portable electronic device 206 is configured with switch arrangement for multiplexing between tasks. The switch arrangement may for example be configured to disconnect one functionality while connecting the other functionality. Multiplexing switch arrangements for use with electronic devices are widely known and therefore will not be described in anymore detail Essentially, the portable electronic device 206 operates in two modes. Mode 1 is implemented when the portable electronic device 206 is connected to a standard USB port of a host device; and mode 2 is implemented when portable electronic device 206 is disconnected from a standard USB port of a host device and/or connected to the modified USB port 204 of the lanyard 200.

Figure 6A:
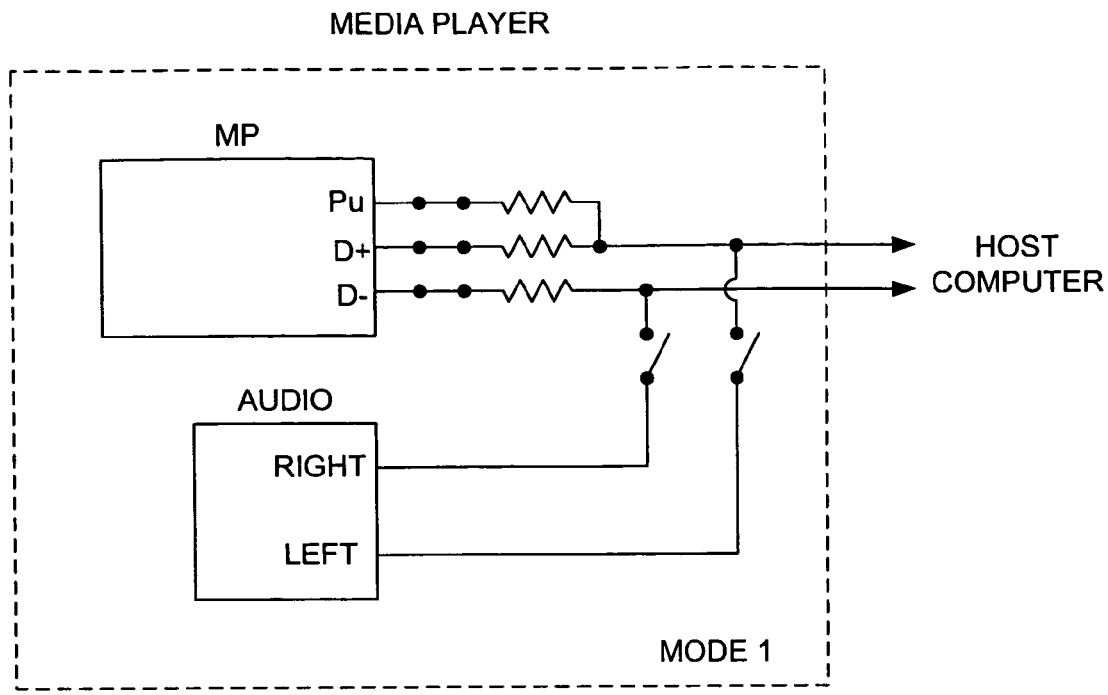
FIGS. 6A and 6B are simplified block diagram of a media player in various modes, in accordance with one embodiment of the present invention.

Referring to FIG. 6A, when mode 1 is active, the audio output of the portable electronic device 206 is powered down so as not to interfere with normal USB traffic. The signal used to power down the audio output is the USB power line (e.g., the +5V power line). When the portable electronic device 206 is plugged into an active standard USB port, the presence of power (e.g., +5V) alerts the portable electronic device 206 that it should disconnect the audio output. This frees the shared lines (USB and audio) to be used exclusively by the USB output.

Figure 6B:
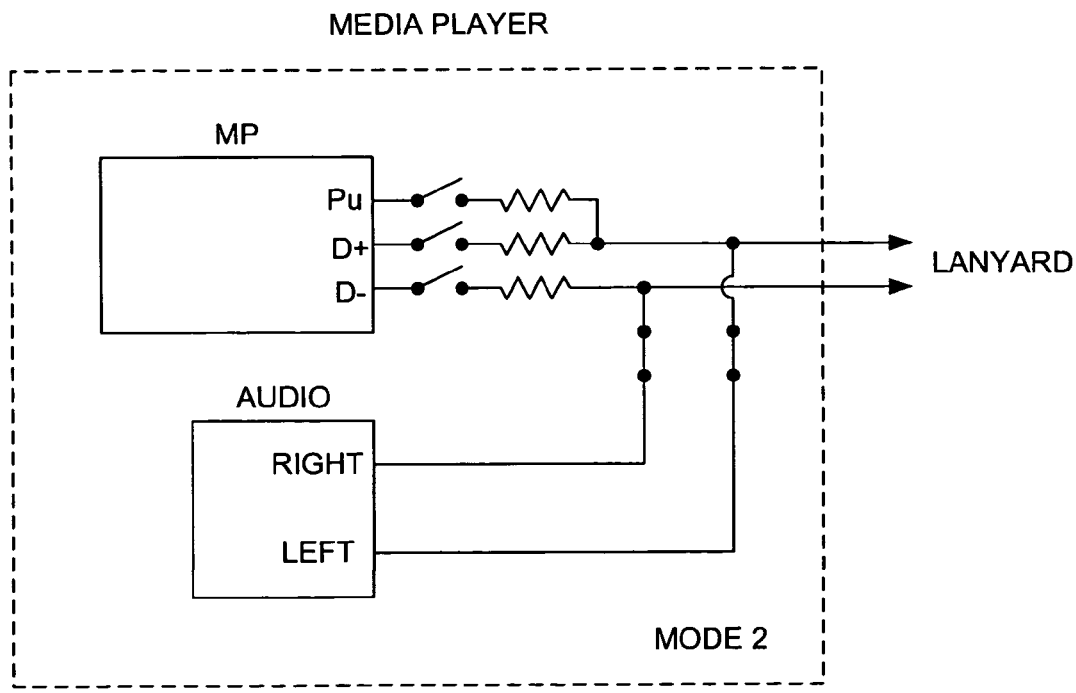

Referring to FIG. 6B, in mode 2 (the normal listening mode) the absence of power (e.g., +5V) causes the portable electronic device 206 to disconnect (e.g., tri state) its standard USB output. This frees the shared lines (USB and audio) to be used exclusively by the audio output.

Alternatively, the USB connectors may be replaced with Firewire connectors or other connectors with similar layouts.

Alternatively, the multiplexing or switching may be performed by a mechanical switch that is activated by a user or that is mechanically activated when the devices are inserted into one another. For example, when the device 206 is plugged into the connector unit 202, the mechanical switch is toggled to a first position that activates the audio output and deactivates the USB output, and when the device 206 is plugged into a host device, the mechanical switch is toggled to a second position that activates the USB output and deactivates the audio output.

The portable electronic device may for example correspond to the media player, and more particularly the music player, disclosed in U.S. Patent Provisional Application No. 60/642,276, and/or U.S. Design patent application No. 29/220,038, both of which are herein incorporated by reference.

Figure 7:
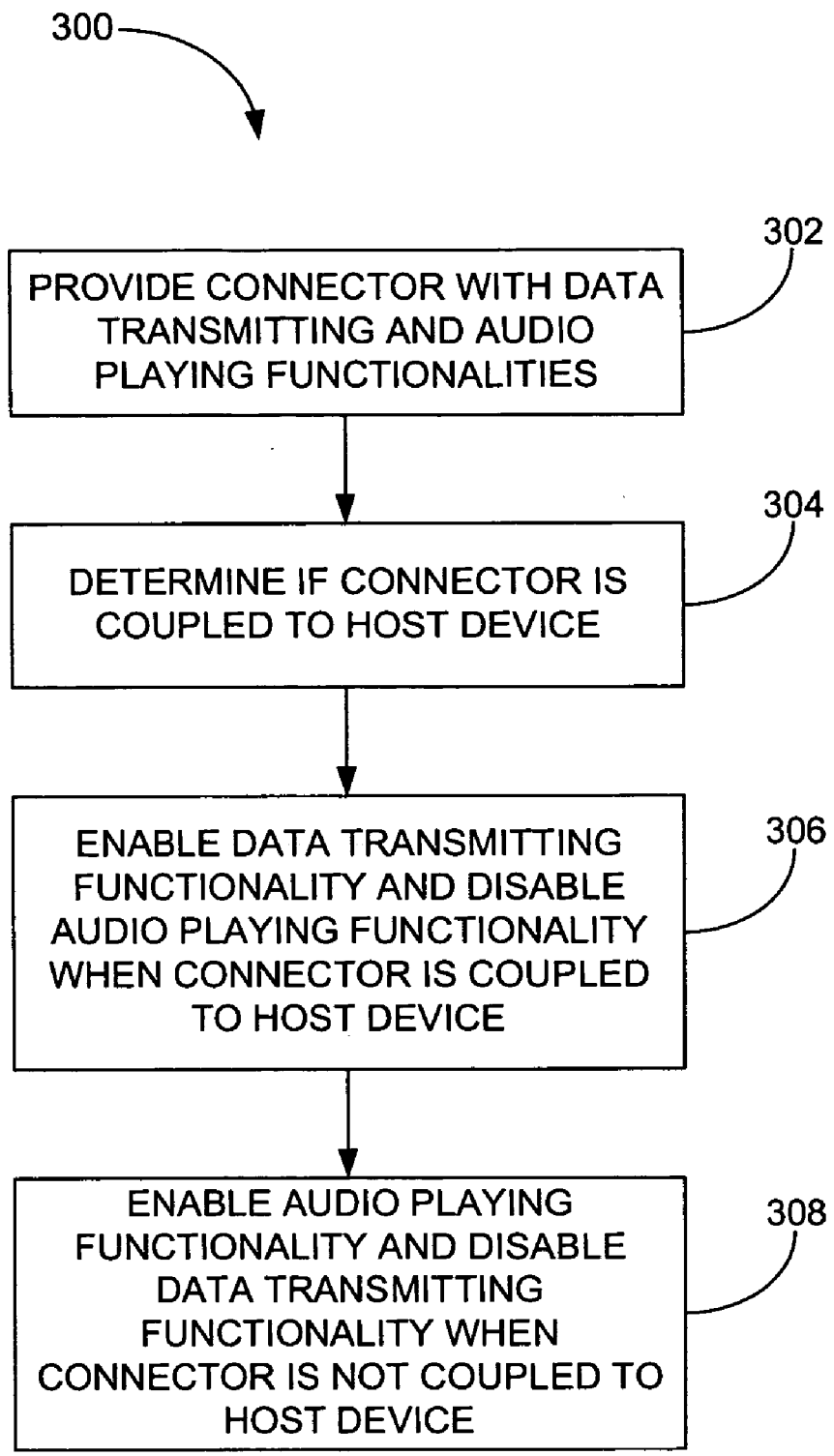
FIG. 7 is a method of operating a portable electronic device with music playing capabilities, in accordance with one embodiment of the present invention.

FIG. 7 is a method 300 of operating a portable electronic device with music playing capabilities, in accordance with one embodiment of the present invention. In block 302, a connector having shared conductors is provided. The shared conductors are capable of both data transmitting functionality and audio playing functionality. By way of example, the connector may be a USB or Firewire connector. In block 304, a determination is made as to whether or not the connector is coupled to a host device. The host device may for example be a general purpose computer. In block 306, the data transmitting functionality is enabled and the audio playing functionality is disabled when the connector is coupled to the host device. The portable electronic device is therefore free to share data with the host device. In block 308, the audio playing functionality is enabled and the data transmitting functionality is disabled when the connector is not coupled to the host device. The portable electronic device is therefore free to output audio as for example to speakers or earphones. Alternatively, the audio playing functionality is enabled and the data transmitting functionality is disabled when the connector is coupled to an audio system such as for example the lanyard shown in FIG. 5.

The various aspects, embodiments, implementations or features of the invention can be used separately or in any combination.

The advantages of the invention are numerous. Different aspects, embodiments or implementations may yield one or more of the following advantages. One advantage of the invention is that portable electronic devices can be conveniently worn, such as about one's neck. Another advantage of the invention is that users of portable electronic devices are able to manage cabling or wires for an output device (e.g., earphones). Still another advantage of the invention is a neck cord that incorporates a device, such as earphones. Yet another advantage of the invention is a neck cord that serves to reduce the amount of cabling or wires that hang off from a user, thereby giving the user greater freedom of movement.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A lanyard for an electronic device, comprising:
an electronic device holder that physically and operatively mates with a handheld electronic device, one or more signals being transferred between the electronic device holder and the handheld electronic device when coupled, wherein, when coupled, the electronic device holder supports the handheld electronic device from above such that the handheld electronic device hangs from the electronic device holder;
a cord attached to the electronic device holder, and forming a loop for placement around a user's neck, the cord carrying one or more signals between the electronic device holder and a peripheral I/O device operatively coupled to the cord; and
a cable having a first end that emanates from the cord and a second end that connects to an I/O device, wherein the cable emanates from a node of the cord and wherein the cable is hard wired to the cord at the node.

2. A lanyard for an electronic device, comprising:
an electronic device holder that physically and operatively mates with a handheld electronic device, one or more signals being transferred between the electronic device holder and the handheld electronic device when coupled, wherein, when coupled, the electronic device holder supports the handheld electronic device from above such that the handheld electronic device hangs from the electronic device holder;
a cord attached to the electronic device holder, and forming a loop for placement around a user's neck, the cord carrying one or more signals between the electronic device holder and a peripheral I/O device operatively coupled to the cord; and
a cable having a first end that emanates from the cord and a second end that connects to an I/O device, wherein the cable emanates from a node of the cord and wherein the position of the node is adjustable along the length of the cord.

3. The lanyard as recited in claim 2 wherein the cable includes a connector that mates with a corresponding connector of the cord, the corresponding connector being located at the node.

4. A lanyard for an electronic device, comprising:
a connector unit that physically mates with and that mechanically and electrically couples to a handheld electronic device, the connector unit including a body and at least an audio connector attached to the body, the audio connector interfacing with a corresponding audio connector of the handheld electronic device when the handheld electronic device and connector unit are mated together;

a pair of cords that form a loop for placement on a person's neck, each of the cords including one or more electrical wires and an outer sheath disposed around the one or more electrical wires, the outer sheath covering a proximal portion of the one or more electrical wires, the pair of cords comprising,
  a first cord fixed to and emanating from a first side of the connector unit, a proximal end of the outer sheath of the first cord being attached to the body of the connector unit and a proximal end of the one or more electrical wires of the first cord being connected to the audio connector of the connector unit, a distal end of the one or more electrical wires of the first cord being connected to a first earphone, a distal end of the outer sheath of the first cord extending to a point between the proximal and distal ends of the one or more electrical wires of the first cord;
  a second cord fixed to and emanating from a second side of the connector unit, a proximal end of the outer sheath of the second cord being attached to the body of the connector unit and a proximal end of the one or more electrical wires of the second cord being connected to the audio connector of the connector unit, a distal end of the one or more electrical wires of the second cord being connected to a second earphone, a distal end of the outer sheath of the second cord extending to a point between the proximal and distal ends of the one or more electrical wires of the second cord;
  a first clasp fixed to the second cord at the distal end of the outer sheath of the second cord;
  a second clasp fixed to the first cord at the distal end of the outer sheath of the first cord;
  wherein the first clasp slidably receives the first cord between the proximal end of the first cord and the second clasp, and the second clasp slidably receives the second cord between the proximal end of the second cord and the first clasp, the clasps sliding along their respective cords in order to adjust the size of the loop formed by the first and second cords, the clasps providing a retaining force on their respective cords in order to hold the position of the cords when a desired size is found.

5. The lanyard as recited in claim 4 wherein the outer sheath is a woven fiber.

6. The lanyard as recited in claim 4 wherein the inner electrical wires include an inner conductive wire and an outer insulator.

7. The lanyard as recited in claim 6 wherein the connector unit includes an audio jack and a mechanical retention feature, the audio jack being for insertion into an audio plug of the electronic device, the mechanical retention feature cooperating with a mechanical retention feature located on the electronic device to secure the connector unit to the electronic device, an inner conductive wire of the first cord being electrically connected to a first contact of the audio jack, an inner conductive wire of the second cord being electrically connected to a second contact of the audio jack.

8. The lanyard as recited in claim 7 wherein the mechanical retention feature is located on a dummy data connector of the connector unit.

9. The lanyard as recited in claim 7 wherein the mechanical retention feature is located on a data connector of the connector unit.

10. The lanyard as recited in claim 4 wherein the first clasp includes a through-hole for slidably receiving the second cord between the connector unit and the second clasp, and wherein the second clasp includes a through hole for slidably receiving the first cord between the connector unit and the first clasp.

11. The lanyard as recited in claim 4 wherein the outer sheath covers the inner wire between the connector unit and the respective clasp, and wherein the electric wire extends exposed from the respective clasp to the respective earphone.

12. The lanyard as recited in claim 4 wherein the connector unit includes an input mechanism for controlling features of the electronic device.

13. A lanyard for an electronic device, comprising:
  an electronic device holder that physically and operatively mates with a handheld electronic device, one or more signals being transferred between the electronic device holder and the handheld electronic device when coupled, wherein, when coupled, the electronic device holder supports the handheld electronic device from above such that the handheld electronic device hangs from the electronic device holder, wherein the electronic device holder comprises an output mechanism; and
  a cord attached to the electronic device holder, and forming a loop for placement around a user's neck, the cord carrying one or more signals between the electronic device holder and a peripheral I/O device operatively coupled to the cord.

14. The lanyard as recited in claim 13 wherein the electronic device holder includes a connector that operatively interfaces with a corresponding connector of the handheld electronic device when the handheld electronic device is coupled to the electronic device holder, and wherein the cord is operatively coupled to the connector.

15. The lanyard as recited in claim 14 wherein the connector is an audio jack, the corresponding connector is an audio port and wherein the cord includes a conductive wire electrically attached to the audio jack.

16. The lanyard as recited in claim 14, wherein the connector provides a biasing force against walls of receptacle in a corresponding connector of the electronic device when the electronic device holder and the handheld electronic device are coupled.

17. The lanyard as recited in claim 13 wherein the cord is adjustable to different loop sizes.

18. The lanyard as recited in claim 13 wherein the electronic device holder includes a mechanical holding feature that secures and releases the electronic device to and from the electronic device holder.

19. The lanyard as recited in claim 13 further including a cable having a first end that emanates from the cord and a second end that connects to an I/O device.

20. The lanyard as recited in claim 19 wherein the I/O device is an earphone.

21. The lanyard as recited in claim 19 wherein the cable is an integral portion of the cord.

22. The lanyard as recited in claim 19 wherein the cable emanates from a node of the cord.

23. The lanyard as recited in claim 13, wherein the electronic device holder comprises a user interface for controlling the handheld electronic device.

24. The lanyard as recited in claim 23, wherein the user interface comprises a touch sensing device.

25. The lanyard as recited in claim 13, wherein the output mechanism comprises a display.

26. The lanyard as recited in claim 13, wherein the electronic device holder comprises a sensor.

27. A lanyard for an electronic device, comprising:
  an electronic device holder that physically and operatively mates with a handheld electronic device, one or more signals being transferred between the electronic device holder and the handheld electronic device when coupled, wherein, when coupled, the electronic device holder supports the handheld electronic device from above such that the handheld electronic device hangs from the electronic device holder, wherein the electronic device holder comprises a functional component of a device different from the handheld electronic device; and a cord attached to the electronic device holder, and forming a loop for placement around a user's neck, the cord carrying one or more signals between the electronic device holder and a peripheral I/O device operatively coupled to the cord.

28. The lanyard as recited in claim 27, wherein the functional component includes software.

29. The lanyard as recited in claim 27, wherein the electronic device holder extends functionality of the electronic device.

30. The lanyard as recited in claim 27, wherein the electronic device holder comprises a user interface for controlling the handheld electronic device.

31. A lanyard for an electronic device, comprising:
a flexible neck cord for forming a loop for placement around a user's neck;
an electronic device holder including a connector for anchoring an electronic device to the flexible neck cord, the connector including at least one electrical contact that comes into electrical engagement with a corresponding contact located on the electronic device when the electronic device is secured to the electronic device holder and wherein the connector contacts a single outer face of the electronic device when secured to the electronic device, wherein the electronic device holder extends functionality of the electronic device and comprises a user interface configured to control the electronic device, wherein the user interface comprises a touch sensing device; and
an electrical wire having a proximal end connected to the electrical contact, and a distal end that extends to a head piece worn on the user's head, the electrical wire emanating from the electronic device holder and running at least partially along the flexible neck cord.

32. The lanyard as recited in claim 31 wherein the neck cord includes a first portion extending from a first side of the electronic device holder and a second portion extending from a second side of the electronic device holder.

33. The lanyard as recited in claim 32 wherein a first electric wire runs along the first portion of the neck cord, and a second electric wire runs along the second portion of the neck cord.

34. The lanyard as recited in claim 33 wherein a proximal segment of the first portion includes a sheath that surrounds the first electric wire, and wherein a proximal segment of the second portion includes a sheath that surrounds the second electric wire.

35. The lanyard as recited in claim 32 wherein the first and second portions of the neck cord are coupled together to form a loop.

36. The lanyard as recited in claim 35 wherein at least one clasp is provided to adjustably secure the first and second portions together.

37. The lanyard as recited in claim 31, wherein the electronic device hangs from the electronic device holder when the electronic device is secured to the electronic device holder.

38. The lanyard as recited in claim 31, wherein the connector provides a biasing force against walls of receptacle in a corresponding connector of the electronic device when the connector is secured to the electronic device.

39. The lanyard as recited in claim 31, wherein the electronic device holder comprises software.

40. A lanyard for an electronic device, comprising:
a flexible neck cord for forming a loop for placement around a user's neck;
an electronic device holder including a connector for anchoring an electronic device to the flexible neck cord, the connector including at least one electrical contact that comes into electrical engagement with a corresponding contact located on the electronic device when the electronic device is secured to the electronic device holder and wherein the connector contacts a single outer face of the electronic device when secured to the electronic device, wherein the electronic device holder extends functionality of the electronic device, wherein the electronic device holder comprises an output mechanism; and
an electrical wire having a proximal end connected to the electrical contact, and a distal end that extends to a head piece worn on the user's head, the electrical wire emanating from the electronic device holder and running at least partially along the flexible neck cord.

41. The lanyard as recited in claim 40, wherein the electronic device holder comprises a user interface configured to control the electronic device.

42. The lanyard as recited in claim 40, wherein the output mechanism comprises a display.

43. The lanyard as recited in claim 40, wherein the electronic device holder comprises a wireless interface for allowing the electronic device to remotely communicate with another device.

44. The lanyard as recited in claim 40, wherein the output mechanism comprises a color indicator.

45. A lanyard for an electronic device, comprising:
a flexible neck cord for forming a loop for placement around a user's neck;
an electronic device holder including a connector for anchoring an electronic device to the flexible neck cord, the connector including at least one electrical contact that comes into electrical engagement with a corresponding contact located on the electronic device when the electronic device is secured to the electronic device holder and wherein the connector contacts a single outer face of the electronic device when secured to the electronic device, wherein the electronic device holder extends functionality of the electronic device, wherein the electronic device holder comprises a sensor; and
an electrical wire having a proximal end connected to the electrical contact, and a distal end that extends to a head piece worn on the user's head, the electrical wire emanating from the electronic device holder and running at least partially along the flexible neck cord.

46. The lanyard as recited in claim 45, wherein the electronic device holder comprises a user interface for controlling the handheld electronic device.

47. The lanyard as recited in claim 46, wherein the user interface comprises a touch sensing device.

* * * * *

UNITED STATES PATENT AND TRADEMARK OFFICE
CERTIFICATE OF CORRECTION

PATENT NO. : 7,650,007 B2  Page 1 of 1
APPLICATION NO. : 11/212514
DATED : January 19, 2010
INVENTOR(S) : Iuliis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1183 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,650,007 B2  
APPLICATION NO. : 11/212514  
DATED : January 19, 2010  
INVENTOR(S) : Daniele De Iuliis et al.

Page 1 of 1

It is certified that error appears in the above-identified patent and that said Letters Patent is hereby corrected as shown below:

In column 12, line 63, after "detail" insert -- . --.

Signed and Sealed this  
Fifteenth Day of November, 2011

David J. Kappos  
*Director of the United States Patent and Trademark Office*